United States Patent
Grzeskowiak, II et al.

(10) Patent No.: US 10,241,252 B1
(45) Date of Patent: Mar. 26, 2019

(54) PROCESSED SLAB WITH EMBEDDED OPTICAL ELEMENTS

(71) Applicant: Cambria Company LLC, Eden Prairie, MN (US)

(72) Inventors: Jon Louis Grzeskowiak, II, Prior Lake, MN (US); Matthew R. LaBrosse, Prior Lake, MN (US); Martin E. Davis, Excelsior, MN (US)

(73) Assignee: Cambria Company LLC, Eden Prairie, MN (US)

( * ) Notice: Subject to any disclaimer, the term of this patent is extended or adjusted under 35 U.S.C. 154(b) by 0 days.

(21) Appl. No.: 15/674,192

(22) Filed: Aug. 10, 2017

(51) Int. Cl.
| | | |
|---|---|---|
| *E04C 1/42* | (2006.01) |
| *F21V 8/00* | (2006.01) |
| *E04C 2/04* | (2006.01) |
| *G09F 9/302* | (2006.01) |
| *A47B 13/08* | (2006.01) |
| *A47B 96/20* | (2006.01) |
| *B28B 23/00* | (2006.01) |
| *B29D 99/00* | (2010.01) |

(52) U.S. Cl.
CPC ............ *G02B 6/0008* (2013.01); *A47B 13/08* (2013.01); *A47B 96/20* (2013.01); *B28B 23/0075* (2013.01); *E04C 1/42* (2013.01); *E04C 2/04* (2013.01); *G09F 9/302* (2013.01); *A47B 2096/208* (2013.01); *B29D 99/0039* (2013.01)

(58) Field of Classification Search
CPC ......... E04C 1/42; G02B 6/0008; A47B 13/08; A47B 96/20
See application file for complete search history.

(56) References Cited

U.S. PATENT DOCUMENTS

| | | | |
|---|---|---|---|
| 4,807,095 A | 2/1989 | Bell | |
| 6,082,886 A | 7/2000 | Stanford | |
| 7,229,203 B2 | 6/2007 | Lath | |
| 7,543,956 B2 | 6/2009 | Piepgras et al. | |
| 8,091,315 B2 | 1/2012 | Losonczi | |
| 8,277,070 B1 | 10/2012 | Schwarz | |
| 2008/0019121 A1 | 1/2008 | Ly | |
| 2010/0281802 A1* | 11/2010 | Losonczi | B28B 7/364 52/307 |
| 2014/0059952 A1 | 3/2014 | Christandl et al. | |
| 2014/0333514 A1 | 11/2014 | Skovsby | |

OTHER PUBLICATIONS

4willis.com [online] "Endless possibilities of light come alive in the DuPont Corian Illumination Series," First Available on or before Oct. 16, 2011 via the Wayback Internet Archive [ retrieved on Apr. 9, 2018] Retrieved from Internet: URL<http://4willis.com/corian/illumination-series.php> 2 pages.

www.coastalconcretecounters.com' [online] "Introducing Illumistone," May 20, 2006, [retrieved on Apr. 9, 2018] Retrieved from Internet: URL<http://www.coastalconcretecounters.com/Illumistone.htm> via the Wayback Internet Archive at URL<http://www.coastalconcretecounters.com/Illumistone.htm> 1 page.

(Continued)

*Primary Examiner* — Anne M Hines
(74) *Attorney, Agent, or Firm* — Fish & Richardson P.C.

(57) ABSTRACT

This document describes systems and process for forming processed slabs having embedded optical elements.

27 Claims, 12 Drawing Sheets

(56) References Cited

OTHER PUBLICATIONS www.concretedecor.net [online] "Concrete Countertop Reinforcement System," Feb. 4, 2004, [retrieved on Apr. 9, 2018] Retrieved from Internet: URL<http://www.concretedecor.net/decorativeconcretearticles/vol-4-no-1-februarymarch-2004/techfab-concrete-counter-tops-reinforcement-system/> 7 pages.

www.concretedecor.net [online] "Fiber Optics in Concrete Countertops," Nov. 6, 2007, [retrieved on Apr. 9, 2018] Retrieved from Internet: URL<http://www.concretedecor.net/decorativeconcretearticles/vol-7-no-7-november-2007/fiber-optics-in-concrete-countertops/> 7 pages.

www.concretenetwork.com [online] "Eight Step Guide to lighting Counters with Fiber-Optics," First available on or before Jul. 14, 2009 via the Wayback Internet Archive, [retrieved on Apr. 9, 2018] Retrieved from Internet: URL<http://www.concretenetwork.com/countertops-fiber-optics/guide.html> 2 pages.

www.concretenetwork.com' [online] "Coastal Concrete Counters, Inc. Uses TechFab's C-Grid to Develop Illumistone," First available on or before Apr. 13, 2005 via the Wayback Internet Archive, [retrieved on Apr. 9, 2018] Retrieved from Internet: URL<https://www.concretenetwork.com/concrete_coastal_counters/fiber_optics.htm> 3 pages.

www.concretenetwork.com'[online] Fiber-optic Concrete Countertops, Scott Cohen, First available on or before Jan. 24, 2009 via the Wayback Internet Archive, [retrieved on Apr. 9, 2018] Retrieved from Internet: URL<https://www.concretenetwork.com/countertops-fiber-optics/> 3 pages.

www.fiberopticproducts.com' [online] "Fiber Optic Concrete Countertops," First available on or before Nov. 4, 2007 via the Wayback Internet Archive [retrieved on Apr. 9, 2018] Retrieved from Internet: URL<http://www.fiberopticproducts.com/Fiber_optic_countertops.htm> 6 pages.

\* cited by examiner

PROCESSED SLAB WITH EMBEDDED OPTICAL ELEMENTS

TECHNICAL FIELD

This document describes systems and processes for forming slab products, for example, a processed slab having one or more embedded optical elements.

BACKGROUND

Stone slabs are a commonly used building material. Granite, marble, soapstone, and other quarried stones are often selected for use as countertops due to their aesthetic properties. Stone slabs may also be formed from a combination of natural and other materials that can provide improved qualities such as aesthetic characteristics, reproducibility, and stain-resistant or heat-resistant properties.

SUMMARY

Some embodiments described herein include processed slabs with embedded optical elements suitable for use in living or working spaces (e.g. along a countertop, table, floor, or the like), and systems and processes for forming such slabs. In particular embodiments, a processed slab includes embedded optical elements that are capable of transmitting visible light to a surface of the slab. In some embodiments, the optical elements can each have a length that is approximately equal to the slab thickness (e.g. and are capable of transmitting visible light between a front major surface and a rear major surface). For example, the optical elements may have lengths such that the fibers do not extend beyond the front major surface and the rear major surface. A light source can be directed toward a first major surface of the processed slab to provide light that is transmitted through the slab to a second major surface. For example, the light source can be positioned rearward of the rear major surface of the processed slab to emit light toward the rear major surface that is then transmitted through optical elements to the front major surface (e.g. without requiring one or more optical bundles underneath the rear major surface that are physically connected to a light source). Alternatively or additionally, a light source may be positioned along a side or end of the slab, and the optical elements may be positioned to transmit light from the side or end of the slab to a front surface, rear surface, and/or another side or end of the slab.

The processed slab can be formed from a particulate mineral mix (or a combination of differently pigmented particulate mixes) and vibrated and compacted in a slab mold. In some embodiments, the optical elements are positioned in the pigmented particulate mineral mix that is dispensed into a mold. The pigmented particulate mineral mix and the optical elements arranged in the mold are then vibrated and compacted to form a processed slab. The front major surface of the slab can be polished to form a smooth surface (e.g. a smooth surface formed by the molded particulate and ends of the optical elements) and allow light transmitted through the embedded optical elements to be visible at the front major surface.

Implementations may include one or more of the following optional features. For example, particular embodiments described herein include a processed stone slab, including a front major surface and a rear major surface, the front and rear major surfaces at least 2 feet wide by at least 6 feet long and extending perpendicularly to a slab thickness, and a plurality of optical elements each having a first end, a second end, and a length between the first end and the second end. The length of each optical element may be parallel (e.g. approximately parallel within 30% of exactly parallel) and equal (e.g. approximately equal within 15% of exactly equal) to the slab thickness, and each optical element is completely surrounded by the particulate mineral mix between the first and second ends.

In some implementations, the system can optionally include one or more of the following features. The optical elements may allow transmission of light between the front major surface and the rear major surface due to total internal reflection. The plurality of optical elements may include fiber optic cables. The front major surface may be defined by the particulate mineral mix and first ends of the plurality of optical elements. The front major surface and/or back major surface may be a polished surface. Each of the plurality of optical elements may be arranged within the processed slab according to a predetermined array. The slab may further include a light source configured to transmit light between the front major surface and the rear major surface through at least one of the plurality of optical elements between the first and second ends. The particulate mineral mix may include predominantly quartz.

Some embodiments described herein include a processed article, including a processed slab having a front major surface and a rear major surface, the front and rear major surfaces at least 2 feet wide by at least 6 feet long and extending perpendicularly to a slab thickness, a plurality of optical elements having a length between first and second ends, and a carrier web connected to the processed slab at least partially by the plurality of optical elements. The optical elements are each attached to the carrier web in a fixed array proximate the first ends, and extend completely through the slab thickness in a direction parallel to the slab thickness.

In some implementations, the system can optionally include one or more of the following features. The article may include a light source configured to transmit light through at least one of the plurality of optical elements between the first and second ends by total internal reflection. The processed slab may include quartz. The plurality of optical elements may include fiber optic cables. Each of the plurality of optical elements may be arranged within the processed slab according to a predetermined array. The carrier web may be configured to be separable from the processed slab.

Some embodiments described herein include a process of forming a processed slab, including dispensing a pigmented particulate mineral mix into a slab mold, positioning a plurality of optical elements within the slab mold parallel with a mold thickness, contemporaneously vibrating and compacting the pigmented particulate mineral mix and plurality of optical elements arranged in the mold so as to form a processed slab that is generally rectangular and has a front major surface and a rear major surface, and polishing the front major surface and/or rear major surface of the slab. The plurality of optical elements each have a length between first and second ends, and wherein the length of each optical element is parallel and equal to the slab thickness such that the first end is visible at the front major face and the second end is visible at the rear major face.

In some implementations, the system can optionally include one or more of the following features. The plurality of optical elements may allow passage of light between the front major surface and the rear major surface by total internal reflection. The step of dispensing the pigmented particulate mix may be performed after the step of positioning a plurality of optical elements within the slab mold. Positioning the plurality of optical elements in the mold may include inserting the optical elements into the pigmented particulate mineral mix within the mold. The process may include inserting a projection into the pigmented particulate mineral mix to form a hole in the pigmented particulate mix, and wherein the step of positioning the plurality of optical elements in the mold comprises inserting an optical element into the hole. The front major surface may be defined by the pigmented particulate mix and first ends of the optical elements.

Some embodiments described herein include a processed slab including a front major surface and a rear major surface, the front and rear major surfaces at least 2 feet wide by at least 6 feet long and extending perpendicularly to a slab thickness defined by a particulate mineral mix, and a plurality of means for transmitting light between the front major surface and the rear major surface, the plurality of means for transmitting being oriented substantially parallel to one another.

In some implementations, the system can optionally include one or more of the following features. Each means for transmitting may include a fiber optic cable having a first end, a second end, and a length between the first end and the second end, wherein the length of each fiber optic cable is parallel and equal to the slab thickness. Each fiber optic cable may be completely surrounded by the particulate mineral mix between the first and second ends.

The articles, systems, and techniques described herein may provide one or more of the following advantages. First, some embodiments described herein provide a stone slab having a plurality of embedded optical elements that add visual appeal to the stone slab. The stone slab may be used as a countertop, work surface, wall covering, floor covering, etc., that is capable of transmitting light through the thickness of a slab at discrete locations. For example, ends of optical elements may be visible on a surface such that light transmitted though the optical elements is visible on the surface.

Second, some embodiments described herein facilitate light transmission through a slab via optical elements that have a thickness similar to the thickness of the stone slab (e.g. less than or equal to the thickness of the stone slab such that the optical elements do not extend externally from the slab). The stone slab may thus include smooth and/or polished surfaces, and the optical elements may not be immediately noticeable when light is not being transmitted through the optical elements and/or may not be immediately felt (e.g. because the optical elements form part of the smooth and/or polished surface).

Third, some embodiments described herein facilitate handling, transportation, and storage of stone slabs having embedded optical elements. For example, slabs may be stacked or handled without the need to handle external optical elements, such as external portions of fiber optic cables extending outward from a surface of the stone slab.

Fourth, some embodiments facilitate the placement of optical elements into a slab mold prior to forming a hardened slab. The finished slab may thus have optical elements that are embedded according to a predetermined array with minimal adjustments to the slab formation process and/or without requiring a permanent skeleton or grid that is permanently embedded within the finished slab.

Fifth, some implementations described herein provide an internal support structure that facilitates placement of optical elements along a predetermined and/or repeatable array within a slab mold. The internal support structure may be used to reduce movement of the optical elements from an initial placement during the slab formation process (e.g. if the positioning and/or orientation of the mold is adjusted during, for example, compaction and curing of a pigmented particulate mineral mix).

Sixth, some implementations described herein facilitate the repeatability of embedding optical elements according a predetermined array. For example, a carrier may efficiently secure the position and orientation of a plurality of optical elements within a mold.

The details of one or more implementations are set forth in the accompanying drawings and the description below. Other potential features and advantages will be apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
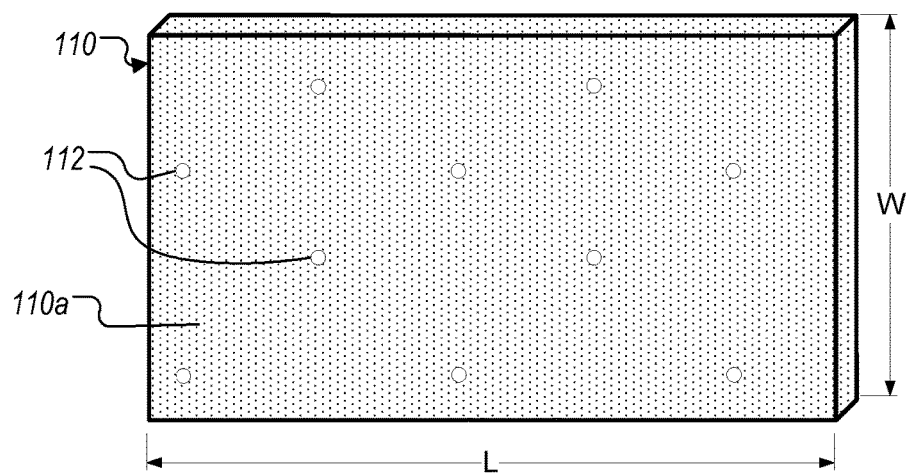
FIGS. 1A and 1B are a front view and a side view of an example of a processed slab with embedded optical elements.
Figure 1B:
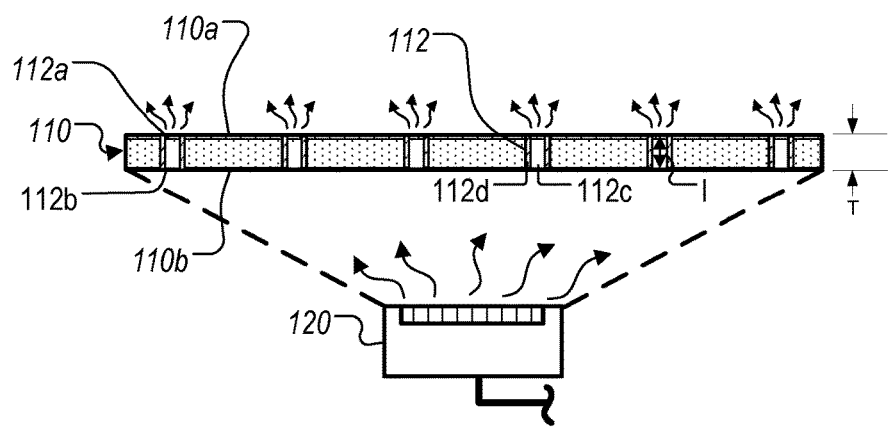
Figure 1C:
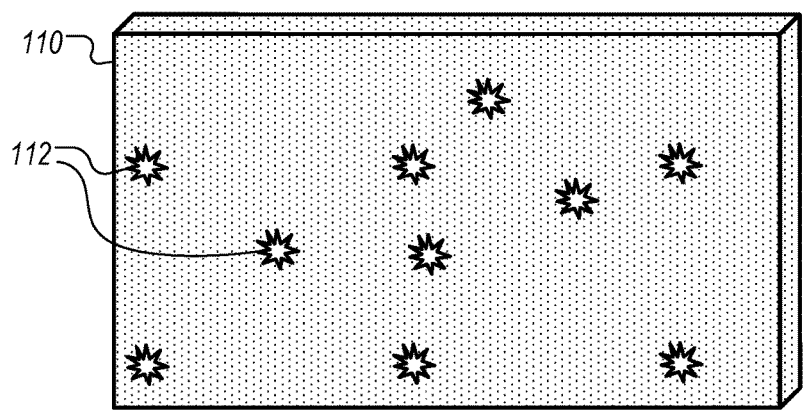
FIG. 1C is a front view of the processed slab of FIG. 1A with light transmitted through the embedded optical elements.

Referring to FIGS. 1A-1C, an exemplary stone slab 110 is shown including embedded optical elements 112. Slab 110 includes a front major surface 110a and a rear major surface 110b. Front major surface 110a and rear major surface 110b are separated by a slab thickness (T) (e.g. a thickness of the hardened stone slab 110). In various exemplary embodiments, slab thickness (T) may be consistent at locations across the front and rear major surfaces 110a, 110b (e.g. slab 110 may have a uniform slab thickness (T)). Slab 110 may be made from one or more mineral materials or mixes, and the optical elements 112 are embedded in the material(s) or mix(es) that make up slab 110. Slab 110 (e.g. a stone slab or portion of a stone slab, such as a cut portion or partial remnant of a slab) may be a processed stone slab, tile, or the like, and may be suitable for installation at one or more locations, including as a countertop, backsplash, reception desk, flooring, wall covering, divider, cabinet facing, veneer, pillar, surround (e.g. fireplace surround), etc.

The optical elements 112 are arranged in an array within the slab 110. For example, optical elements 112 may be positioned according to a predetermined array such that the individual optical elements 112 are arranged according to a specified pattern. In various exemplary embodiments, the predetermined array can be selected to provide a predetermined visual appearance, particularly when light is transmitted through optical elements 112. Alternatively or additionally, optical elements 112 may be positioned randomly, or in an arrangement that appears random, within slab 110. In an exemplary embodiment, optical elements 112 have a substantially uniform density throughout slab 110 (e.g. each quadrant of slab 110 having a uniform surface area has about the same number of optical elements 112).

Slab 110 may be processed and/or cut to have a slab length (L) and a slab width (W), which in this embodiment defines front major surface 110a and rear major surface 110b. For example, stone slab 110 may be a relatively large slab that may be cut to specific shapes for use in living or working spaces (e.g., along a countertop, table, floor, or the like). In various exemplary embodiments, stone slab 110 is at least 3 feet wide by at least 6 feet long, for example between about 3 feet and 18 feet wide and between about 6 feet and 24 feet long, or between about 4.5 feet and 7 feet wide and between about 10 feet and 12 feet long. In some exemplary embodiments, stone slab 110 is about 7 feet wide by about 12 feet long. In other embodiments, stone slab 110 is about 4.5 feet wide (approximately 140 cm wide) by about 10 feet long (approximately 310 cm long).

Stone slab 110 may be a processed stone slab (e.g. such as a molded stone slab) including quartz and/or other particulate mineral material that, when mixed with pigments and a resin binder and compressed, provides a hardened slab product suitable for use in living or working spaces (e.g., along a countertop, table, floor, or the like). Manufacturing stone slab 110 may include steps of dispensing one or more particulate mineral mixes in a mold, vibrating and/or compacting the particulate mineral mixes, curing the compacted mix, polishing a surface, and/or other operations.

Stone slab 110 may be formed in a process in which one or more particulate mineral mixes are dispensed into a mold, vibrated, compressed, hardened, cut, and/or polished to produce a finished stone slab. In some embodiments, one or more of the particulate mineral mixes used to form the stone slabs can include organic polymer(s) and an inorganic (mineral) particulate component. The inorganic (mineral) particulate component may include such components as silicon, basalt, glass, diamond, rocks, pebbles, shells, a variety of quartz containing materials, such as, for example, but not limited to: crushed quartz, sand, quartz particles, and the like, or any combination thereof. In some embodiments, one or more particulate mineral mixes each comprise quartz as a predominant component, which may include sand of various particle sizes and of different combinations. In the resulting stone slab, the organic and inorganic materials can be linked using a binder, which may include for example, monofunctional or multifunctional silane molecules, dendrimeric molecules, and the like, that may have the ability to bind the organic and inorganic components of the composite stone mix. The binders may further include a mixture of various components, such as initiators, hardeners, catalysts, binding molecules and bridges, or any combination thereof. Some or all of the mixes dispensed in the mold may include components that are combined in a mixing apparatus (not shown) prior to being conveyed to the mold. The mixing apparatus can be used to blend raw material (such as quartz, organic polymers, unsaturated polymers, and the like) at various ratios. For example, some or all of the mixes dispensed in the mold may include about 80-95% quartz aggregates to about 5-15% polymer resins. In addition, various additives, may be added to the raw materials in the mixing apparatus, such additives may include, metallic pieces (e.g., copper flecks or the like), colorants, dyes, pigments, chemical reagents, antimicrobial substances, fungicidal agents, and the like, or any combination thereof.

After the mold has been sufficiently filled with the one or more particulate mineral mixes, the mold and/or its contents may be subjected to one or more subsequent operations. For example, compaction pressure, vibration, and vacuum may be applied to the contents inside the filled mold, thereby converting the one or more particulate mixes into a slab. The filled mold (with the compacted and hardened slab therein) may proceed to a curing operation during which the material used to form the slab (including any resin binder material) are cured via a heating or other curing process, thereby further strengthening the slab inside the filled mold. After the slab is fully cured and sufficiently cooled, the hardened and cured slab may be removed from the mold.

In some embodiments, the hardened and cured slab may be polished to a smooth finish. The polishing step may reveal ends of optical elements embedded within the slab, and/or produce a smooth surface in which ends of optical elements are flush with the hardened particulate surface such that discontinuities or rough edges are reduced.

In some exemplary embodiments, slab 110 may have one or more aesthetic effects (e.g. due to the visual appearance of one or more particulate mineral mixes), such as veins that extend partly or fully across a complete length (L) of slab 110, through all or part of thickness (T), and/or positioned relative to one another based on a predetermined pattern. The optical elements 112 may be arranged to complement an aesthetic effect of slab 110, such as the aesthetic effect due to the visual appearance of one or more particulate mineral mixes. For example, slab 110 may include a first vein, second vein, and/or background pattern, and the optical elements 112 may be arranged to enhance the appearance of an outline or boundary of the first and/or second veins by having a higher concentration along the outline or boundary of the vein. Alternatively or additionally, the distribution concentration of the optical elements 112 may be selected such that the optical elements are only present, or primarily present, in the first vein or the background pattern by having a relatively higher distribution concentration in the first vein or background pattern and a relatively lower distribution concentration in the second vein.

The optical elements 112 have characteristics that allow transmission of light (e.g. visible light) between first and second ends of the optical element. In an exemplary embodiment, optical element 112 is a fiber optic cable configured to carry light between first and second ends (e.g. by total internal reflection). Optical element 112 may include one or more layers of different material composition. For example, optical element 112 may include a first layer 112c and a second layer 112d surrounding (directly or indirectly) first layer 112c. First layer 112c may be a core layer and second layer 112d may be a cladding layer having a refractive index different than first layer 112c such that light may be transmitted through the core due to total internal reflection, for example. In some exemplary embodiments, optical element 112 may include one or more protective layers that protect first layer 112c and/or second layer 112d from damage.

In some exemplary embodiments, light is transmitted through the optical element 112 due in part to a difference in refractive index between the optical element 112 and the material of slab 110 (e.g. the particulate mineral mix that makes up the majority of slab 110). For example, optical element 112 may have a uniform material composition, and/or materials having similar refractive indices. Interaction between the optical element 112 and the material of slab 110 facilitates transmission of light as a result of total internal reflection. In various exemplary embodiments, optical element 112 comprises one or more glass (e.g. silica glass) and/or polymer materials, such as polymethyl methacrylate, fluorinated polymers, etc. Optical elements 112 may be highly heat-resistant such that optical elements 112 can withstand heat applied to the particulate mineral mix during manufacturing of slab 110 without deformation, shrinkage, damage, etc. that significantly alters the light transmission characteristics of optical elements 112.

The optical elements have geometry and dimensions that allow transmission of visible light between front major surface 110a and rear major surface 110b of slab 110. In an exemplary embodiment, optical elements 112 have a substantially cylindrical shape, and include first and second circular ends 112a, 112b, separated by a length (L). The cross-section of optical element 112 may be uniform (e.g. a circle of consistent area) between first and second ends 112a, 112b. In various exemplary embodiments, the optical elements 112 have a diameter between about 0.1 mm and 10 mm, 0.5 mm and 5.0 mm, or about 2.0 mm. Such diameters provide effective transmission of visible light for affecting the aesthetic appearance of slab 110, while facilitating a smooth surface. In some embodiments, optical elements 112 may have an oval, elliptical, square, parallelogram, polygon, etc. In some embodiments, various optical elements 112 embedded in slab 110 may have different shapes and sizes, and the shapes and sizes of optical elements 112 may be selected to affect the visual appearance of slab 110.

Length (L) of optical elements 112 may be equal to thickness (T) of slab 110 (FIG. 1B). Such relative dimensions of optical elements 112 and slab 110 allow first and second ends 112a, 112b to extend through the entire thickness (T) of slab 110 such that the optical elements are visible (e.g. when light is transmitted through optical elements 112) from the front major surface 110a and the rear major surface 110b, yet remain within the slab 110 such that portions of the optical elements 112 (e.g. along the length (L) between first and second ends 112a, 112b) do not extend externally beyond the front or rear major surfaces 110a, 110b of slab 110. In such embodiments, front major surface 110a and rear major surface 110b may be oriented substantially perpendicular to the slab thickness (T), and the optical elements 112 are substantially parallel to the slab thickness (T). For example, the optical elements 112 may be completely surrounded by the particulate mineral mix of slab 110 between first and second ends 112a, 112b.

A length (L) of optical elements 112 that is equal to (or less than) the thickness (T) may facilitate handling, transportation, storage, and installation of slab 110, while being able to provide light transmission between front and rear major surfaces 112a, 112b. For example, in some embodiments, external optical elements that would otherwise need to be collected and/or bundled are avoided. Alternatively or additionally, optical elements 112 can transmit light between front and rear major surfaces 112a, 112b without being directly connected to a light source or other structure external to slab 110.

In some exemplary embodiments, the first and second ends 112a, 112b of optical elements 112 are exposed. For example, the first and second ends 112a, 112b form part of the front and/or rear major surfaces of slab 110. The first and/or second ends 112a, 112b may be polished together with the other portions of the front and/or back major surface to provide a smooth, consistent surface. In some embodiments, a gloss level between the first ends 112a of optical element 112 and other portions of front major surface 110a are substantially similar such that the first ends 112a are not immediately observable through casual viewing of the slab 110 when light is not transmitted through the slab 110, yet provide a discrete location of light transmission when light is transmitted through the slab 110.

In some exemplary embodiments, the first and second ends 112a, 112b, are covered by particulate material of slab 110 (e.g. in configurations in which optical elements 112 are parallel to a slab thickness and the length (L) is less than the slab thickness, or the optical elements are angled relative to the slab thickness). Optical elements 112 that are not exposed at first and/or second ends 112a, 112b may facilitate transmission of light through slab 110 while promoting a smooth surface and/or that reduces the visible appearance of optical elements 112 when light is not actively transmitted through slab 110. In some embodiments, the location of first and/or second ends 112a, 112b relative to an exposed surface of slab 110 may be selected to affect the visual effect created by optical elements 112. For example, first and/or second ends 112a, 112b embedded deeper within slab 110 may result in relatively less light transmission, or no light transmission, observable at a surface of the slab, or result in a more diffuse appearance, and first and second ends 112a, 112b, near or exposed at a surface of slab 110 may result in relatively greater light transmission observable at a surface, or result in a more discrete light.

Referring still to FIG. 1B, a light source 120 may be positioned to direct light toward rear major surface 112b (e.g. positioned underneath the slab 110). The light source 120 provides light for transmission through the slab thickness (T) of the slab 110 via the optical elements 112 such that the light is visible at the front major surface 110a of the slab 110. In various exemplary embodiments, light source 120 may be positioned to direct light from rear surface 110b to a side surface 110c, between two side surfaces 110c, etc.

The light source 120 can be any type of suitable device that produces light. In some embodiments, the light source 120 is a light source that produces diffuse light, and may include a fluorescent, incandescent, LED, halogen, or tungsten light source, or the like, for example. In addition, the light sources 120 can be capable of using scattering techniques to increase the spread of light toward the rear major surface 110b of the slab 110 such that a greater number of optical elements 112 receive light, and/or a relatively consistent intensity of light, which in turn can be transmitted through the slab thickness. The light may be emitted at discrete locations of slab 110 through the first ends 112a of optical elements 112 such that the light is visible at the front major surface 110a. In some embodiments, light is substantially diffuse adjacent rear major surface 110b, while discrete points of light are visible on the front major surface 110.

For example, slab 110 may be installed as a countertop positioned above a cabinet or other enclosure that at least partially supports slab 110. A diffuse light source, such as a light bulb, may illuminate the enclosure below slab 110, while discrete points of light are visible on the exposed front major surface 110a of slab 110. The aesthetic effect may be enhanced when the level of ambient lighting of the environment that slab 110 is situated in is relatively low.

Light source 120 may be configured to vary one or more characteristics of its light output during operation. In various exemplary embodiments, light source 120 may be configured to vary the color, color temperature, intensity, duration, direction, and/or other characteristics of light, which in turn may vary the color, temperature, intensity, duration, direction or other characteristics of light emitted at discrete locations on front major surface 112a of slab 110. For example, the direction, duration, and/or intensity may be varied to create a twinkling effect on front major surface 110a.

Alternatively or additionally, light source 120 may be coordinated with one or more other systems that affect the environment where slab 110 is installed. For example, light source 120 may be programmed to output light that matches the volume, rhythm, etc. of music or audio in the installation environment, pressure applied to the slab 110 or surrounding surfaces, etc. to create the effect of an active surface. In some embodiments, slab 110 may be configured to respond to one or more inputs to function as a smart surface. For example, light source 120 may be adjustable to alter the characteristics of light transmitted through slab 110, and may be adjustable by one or more user inputs. In an exemplary embodiment, slab 110 includes an optical-touch input configured to receive an input by a user touching slab 110. A user may touch a surface of slab 110 to toggle the light source 120 on and off, press or hold a surface of slab 110 to dim or increase the intensity of light source 120, tap a surface of slab 110 to alter the color of light source 120, etc. In some embodiments, the distribution concentration of the optical elements is relatively high and sufficient to display moving graphics or videos that a user may interact with (e.g. such as a user would interact with a tablet computing device).

Referring to FIGS. 1A and 1C, the visual appearance of slab 110 may be altered by changing the light that is transmitted through optical elements 112. In a first configuration (FIG. 1A), a light source is not active and little or no light is transmitted through optical elements 112 (e.g. only ambient light transmitted through the optical elements 112). Optical elements 112 may not be immediately visible, and may not significantly affect the aesthetic appearance of slab 110. For example, the characteristics of the pigmented material mix(es) that make up the majority of slab 110, and/or any veins, patterns, etc. resulting from the pigmented material mix(es) provide the primary aesthetic appearance. In a second configuration, a light source outputs visible light that is transmitted through one or more optical elements 112. The aesthetic appearance of slab 110 is changed such that discrete points of light are visible at the locations of optical elements 112. Other locations (e.g. where optical elements 112 are not present) may be substantially opaque and/or transmit less or no light relative to optical elements 112.

In some exemplary embodiments, the distribution concentration and arrangement of optical elements 112 may provide a selected aesthetic appearance both when a light source is not active and when a light source actively transmits a relatively high level of light through the optical elements 112. For example, a relatively high distribution concentration of the optical elements 112 may result in a relatively high volume of the optical elements relative to particulate matter. The color (or absence of color) of the optical elements 112 may thus affect the overall visual appearance of the slab even when little light is transmitted through the optical elements 112 (e.g. a light source is not actively transmitting light through the optical elements 112). In some embodiments, the color of the surrounding particulate matter may be made darker (e.g. when the optical elements 112 are clear or lighter) to maintain a particular overall appearance. Alternatively or additionally, the optical elements 112 may be arranged to provide a design, logo, symbol, words, etc. that are readily perceivable both when a light source is actively transmitting light through the optical elements 112 and when little light is transmitted through optical elements 112.

Figure 1D:
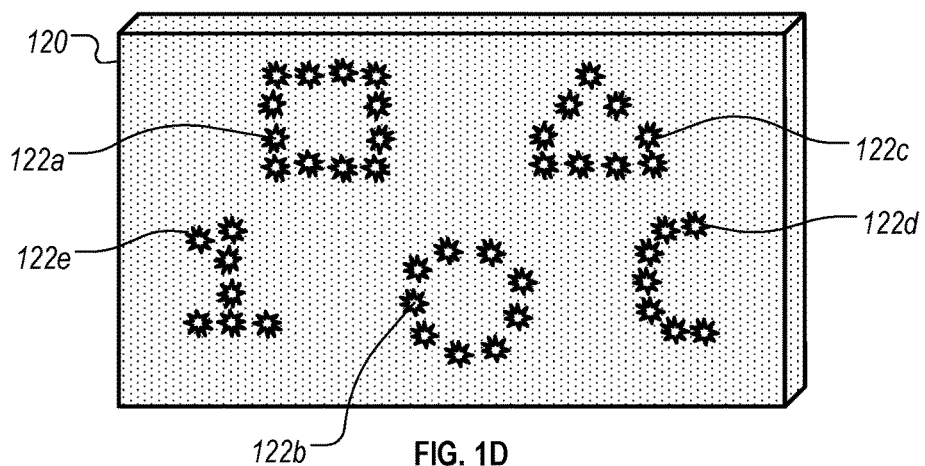
FIG. 1D is a top view of an example of a processed slab with embedded optical elements arranged in different arrays.

Referring to FIG. 1D, a slab 120 with embedded optical elements arranged in different arrays 122a, 122b, 122c, 122d, and 122e is shown. Slab 120 includes embedded optical elements that are arranged in various patterns (e.g., a square 122a, a circle 122b, a triangle 122c, a number 122e, a letter 122d). Each of the arrays 122a, 122b, 122c, 122d, and 122e can be formed by positioning individual optical elements according to a predetermined array prior to forming a hardened slab. For example, the optical elements can be arranged according to a predetermined array within a slab mold before the particulate mix is cured to form a hardened slab (e.g. before or after particulate mineral mix is dispensed into the mold). The mixture and the arranged optical elements can then be processed to form a hardened slab in which the optical elements are embedded in an array that corresponds to the arrangement within the slab mold.

In some embodiments, the optical elements can be arranged such that the optical elements provide a predetermined visual impression when light is transmitted through the slab 120. For example, the optical elements may be arranged to provide the visual appearance of a logo, word(s), image, and/or other graphical feature. In some embodiments, the optical elements may be arranged to complement a graphic or other aesthetic provided by slab 120. For example, an image or logo may be provided on a surface of the slab 120 (e.g. formed from the particulate mineral mix, painted, printed, applied, etc.), and one or more optical elements may provide a discrete light at a particular location, such as the eye of a character in the graphic, a star in a constellation, or other graphical element.

Figure 2A:
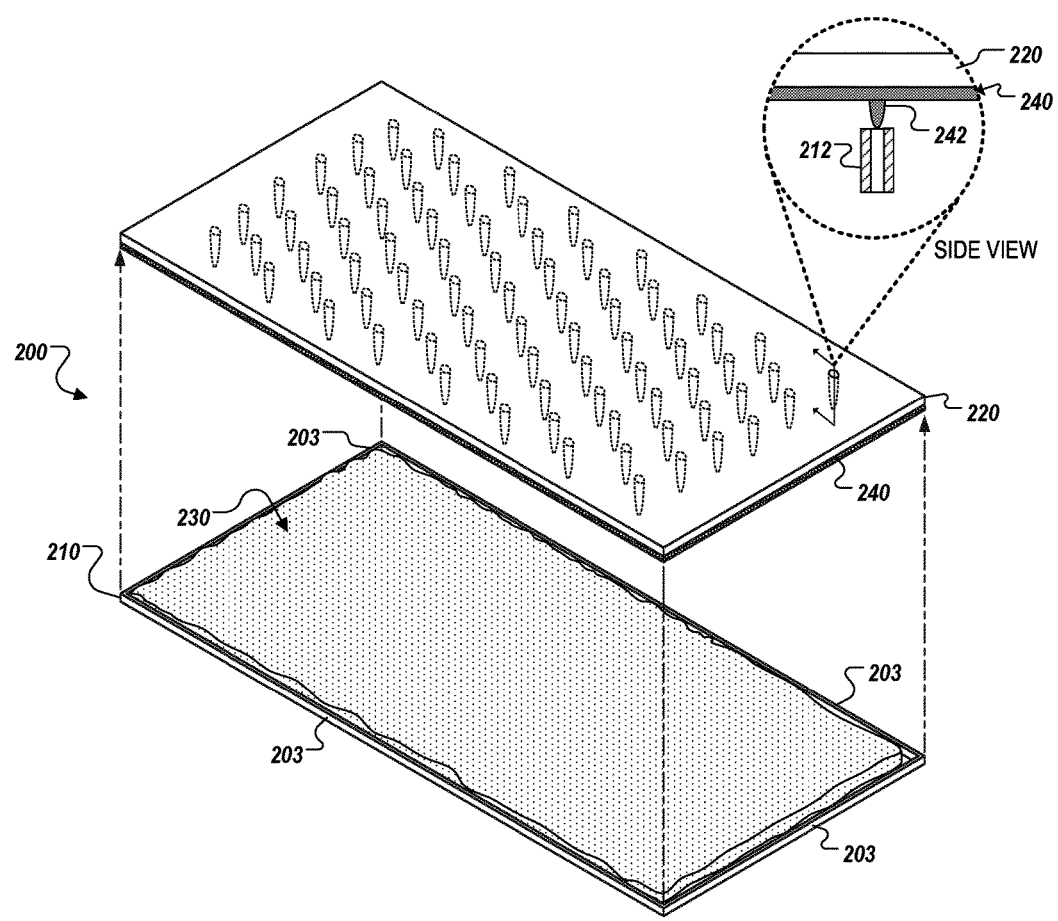
FIGS. 2A and 2B are exploded and assembled views of an example of a horizontal slab mold used to form a processed slab, in accordance with some embodiments.
Figure 2B:
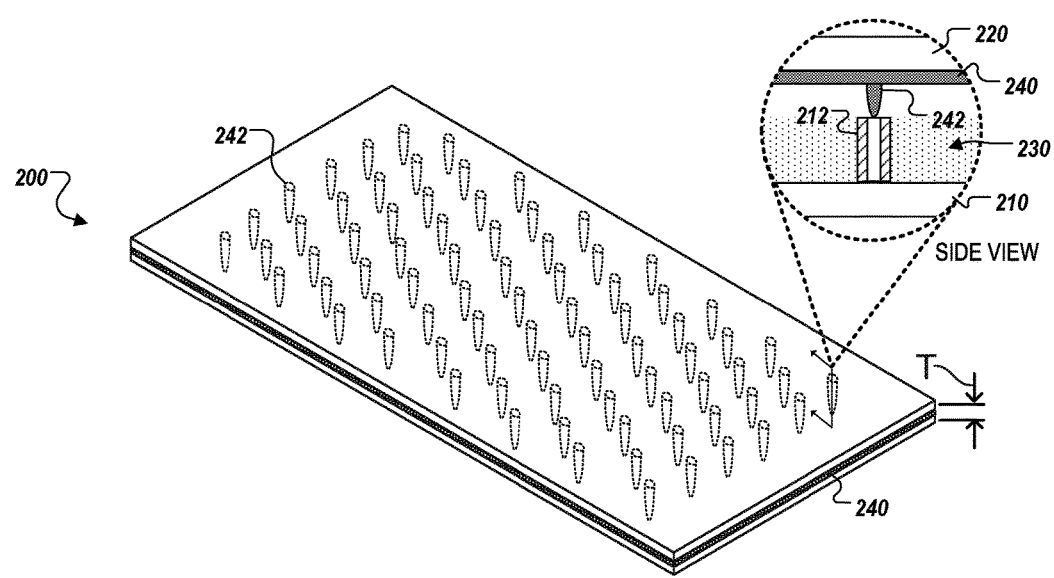

Referring now to FIGS. 2A and 2B, exploded and assembled views of a slab mold 200 are shown. Slab mold 200 includes a first slab mold portion 210 and a second slab mold portion 220. The slab mold 200 includes a planar mold floor bounded by a collection of mold walls 203 extending perpendicular from the planar mold floor, defining a general tray-like shape where a pigmented particulate mineral mix 230 may be contained (e.g. after being dispensed from one or more collection hoppers, for example). The second slab mold portion 220 may be joined with the first slab mold portion 210 to form a mold cavity that contains the particulate mineral mix 230 during subsequent vibro-compaction and/or curing operations. In various exemplary embodiments, one or more of the mold walls may be formed as part of first slab mold portion 210 and/or second slab mold portion 220.

The slab mold 200 may be formed at least partially of a polymer (e.g. including a flexible or elastomeric material), paper, wood, metal, or a combination thereof. The slab mold 200 includes walls 203 that at least partially define a cavity having a length and a width that approximates that of the slab to be formed. In some embodiments, the slab mold 200 can define a cavity having a thickness of at least between about 0.25 in. and 12 in., 0.5 in. and 6 in., or about 3 in.

The slab mold 200 may facilitate formation of a processed slab having embedded optical elements, such as the processed slab 110 having embedded optical elements 110 shown in FIGS. 1A-1C. In an exemplary embodiment, one or more particulate mineral mixes 230 are dispensed into the first slab mold portion 210 (e.g. into the cavity bounded by walls 203). A carrier 240 is then moved toward the mix 230 in first mold portion 210 such that optical elements 212 carried by carrier 240 are pushed into mix 230. For example, carrier 240 brings optical elements 212 into contact with mix 230, and/or pushes the optical elements 212 into mix 230 such that at least a portion of each optical element is completely surrounded by the mix 230.

Carrier 240 may maintain optical elements 212 in a predetermined array, and/or provide additional rigidity to facilitate insertion of optical elements into mix 230. For example, the optical elements 212 may be loaded to the protrusions 242 of carrier 240, and pressed into the mix 230 by the protrusions 242. In some exemplary embodiments, protrusions 242 provide a substantially rigid pin that facilitates insertion into the particulate mix. Alternatively or additionally, protrusion 242 may at least partially surround optical elements 212 (e.g. in the form of a sleeve) to facilitate insertion of the optical elements 212 into the mix 230.

In an exemplary embodiment, projections 242 are arranged on a major planar surface of carrier 240. Multiple projections 242 and optical elements 212 may be inserted into mix 230 simultaneously. For example, carrier 240 may be brought into contact with mix 230 by bringing the entire carrier 240 into contact with the entire surface of mix 230 in mold 200. In other exemplary embodiments, carrier 240 may be rolled across mix 230, or otherwise brought into contact individually or in groups (e.g. as carrier 240 is moved across the exposed surface of mix 230).

After the optical elements 212 are surrounded by the mix 230, the slab mold 200 is assembled by joining first slab mold portion 210 with second slab mold portion 220 (e.g. as shown in FIG. 2B). In some embodiments, carrier 240 and second slab mold portion 220 are brought together with first mold portion 210 as a singular unit (e.g. and carrier 240 may be part of second slab mold portion 220 itself). Alternatively, carrier 240 may first bring optical elements 212 into contact with mix 230, and second slab mold portion 220 may subsequently be joined with first slab mold portion 210.

Referring now to FIG. 2B, an assembled slab mold 200 is shown. The optical elements 212 are positioned at least partially within mix 230 such that at least a portion of the optical elements 212 are completely surrounded by mix 230. In some embodiments, optical elements 212 are completely embedded within mix 230 such that the mix 230 covers ends of optical elements 212 and completely surrounds the optical elements 212 between the ends.

In some embodiments, the assembled slab mold 200 can be used in subsequent operations to form a processed slab having embedded optical elements. For example, the mix 230 and the optical elements 212 can be contemporaneously vibrated and compacted within the assembled slab mold 200 to form a processed slab that has substantially same dimensions as the inner dimensions of the mold 200 (e.g., defined by walls 203 and the height of the mold 200). The resulting slab is thus formed with the optical elements 212 embedded in a particular array similar to the array of protrusions 242, for example. Accordingly, the protrusions 242, and optical elements 212 loaded to the protrusions 242, may be arranged in any predetermined array or pattern based on a desired array or pattern of the optical elements 212 within the final processed slab.

In some embodiments, carrier 240 may form a layer in an intermediate structure that may be removed or separated to form a finished stone slab. For example, after the vibro-compaction and/or curing operations, carrier 240 may remain affixed to the resulting slab. Carrier 240 may be subsequently separated by cutting and/or grinding carrier 240 away from the slab to produce a smooth surface of the finished stone slab.

In some embodiments, carrier 240 may be removed before the mix 230 is formed into a hardened slab. For example, carrier 240 may be moved toward the first slab mold portion 210 such that optical elements 212 are positioned at least partially with the mix 230. The optical elements 212 are then detached from carrier 240, for example, by mechanically decoupling, pneumatically decoupling, etc. In some embodiments, a force joining optical elements 212 with carrier 240 is less than a force between optical elements 212 and mix 230 such that, after being pushed into mix 230, the optical elements remain in mix 230 when carrier 240 is moved in a direction away from mix 230. The second slab mold portion 220 may then be joined with first slab mold portion 210 to enclose the mix 230 and optical elements 212 within the mold cavity.

Figure 2C:
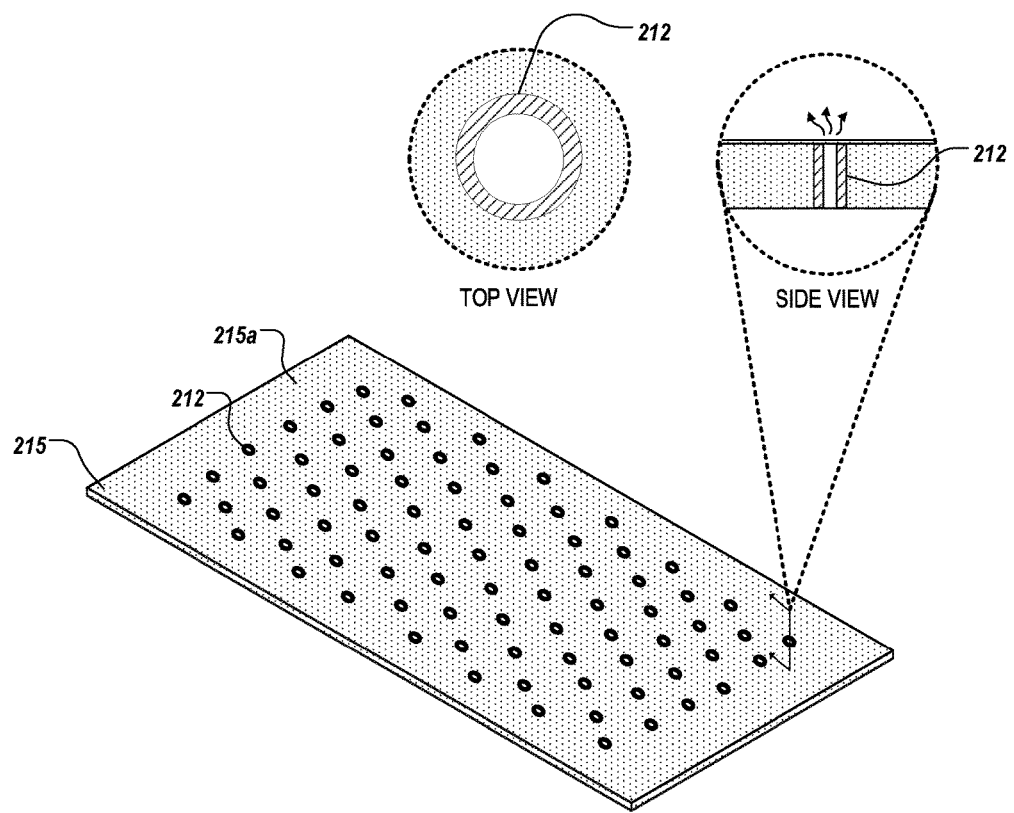
FIG. 2C is a perspective view of an example of a processed slab with embedded optical elements that is formed using the slab mold illustrated in FIGS. 2A and 2B.

Referring to FIG. 2C, a processed slab 215 with embedded optical elements 212 formed using the slab mold 200 is shown. The dimensions of the slab 215 are substantially similar to the dimensions defined by the walls 203 of the mold 200. Major surface 215a may result from polishing and/or removing a portion of carrier 240 such that optical elements 212 are visible on the major surface 215a of the slab 215 (e.g. when light is transmitted through optical elements). In some embodiments, after the mixture 230 within the mold 210 has been vibrated and compacted to form a processed slab, protrusions 242 of carrier 240 and/or a top portion of the slab may be cut and/or otherwise removed. Alternatively or additionally, the major surface 215a may be polished until entirely all of carrier 240 is removed from the processed slab 215. As depicted in FIG. 2C, removal of remaining portions of carrier 240 provides a clean front major surface 215a such that optical elements 212 may be visible on the front major surface 215a.

Figure 3A:
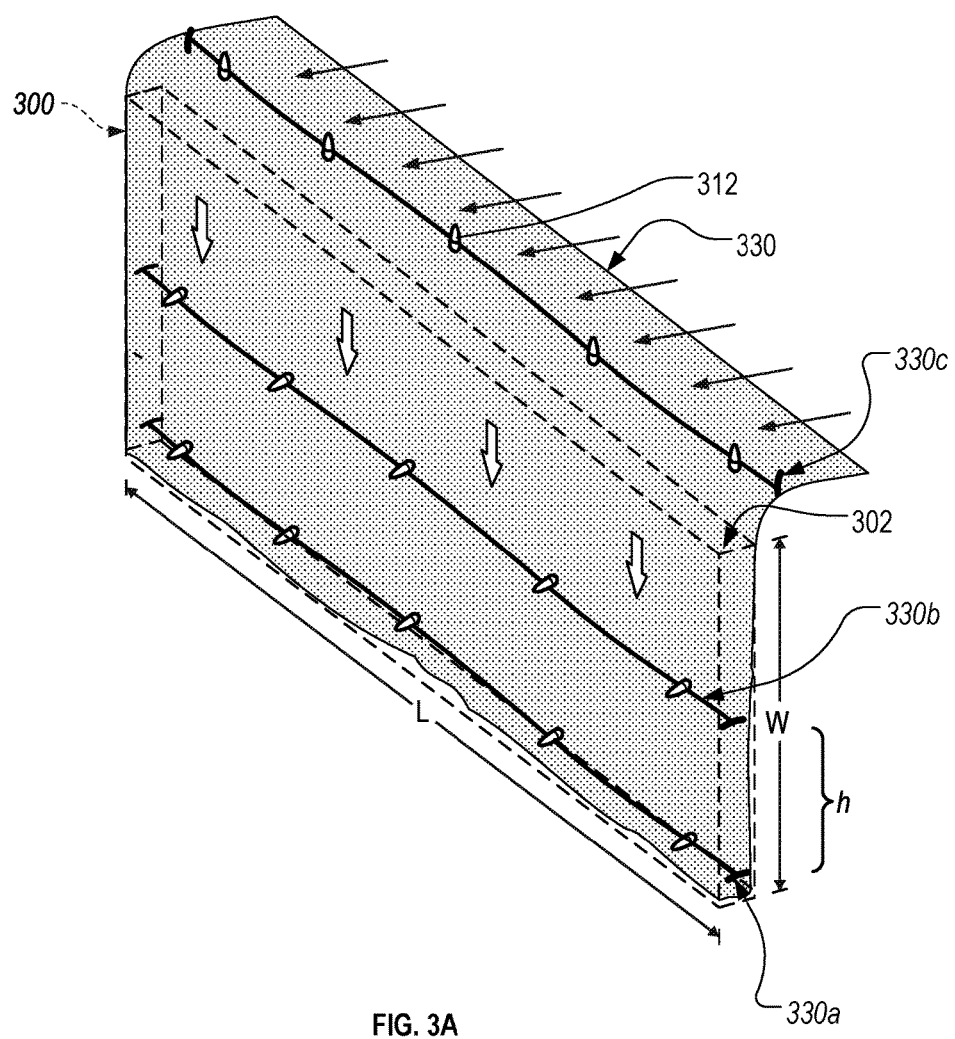
FIG. 3A is a perspective view of an example of a vertical slab mold used to form a processed slab, in accordance with some embodiments.

Referring to FIG. 3A, a perspective view of an example slab mold 300 is depicted, while particulate mix is dispensed while the slab mold 300 is in a non-horizontal orientation (e.g. angled 15°, 30°, 45°, 60°, 75°, 90°, etc. from horizontal). The mold 300 is oriented non-horizontally during dispensation of a particulate mineral mix 330 and/or optical elements 312 into the mold 300. For example, the mold 300 can include a shell portion that at least partially defines a space (shown in dashed lines in FIG. 3A) for receiving the mix 330 via an upwardly facing opening 302 of the mold 300. The mix 330 can be dispensed from one or more separate conveyer lines that transport the mix 330 to a region above the opening 302 so that the mix 330 is then vertically poured into the mold 300. The mold 300 can be formed of a structure that includes a polymer (e.g. including a flexible or elastomeric material), paper, wood, metal, or a combination thereof.

In some embodiments, the mold 300 can be vertically oriented during dispensation of the mix 330 such that a major surface of the mold 300 is positioned in a vertical position (e.g., 80 degrees from the horizontal+/−10 degrees). The poured mix 330 accumulates over previously poured mix. In an exemplary embodiment, the mold 300 at least partially defines a length L and a width W of a hardened slab to be formed (because the mold 300 retains the mix 330 therein throughout the subsequent compaction and curing processes).

The slab mold 300 may be used to form a processed slab with embedded optical elements, such as a processed slab having one or more features and characteristics similar to processed slab 110 depicted in FIG. 1A. During dispensation of the mix 330 into mold 300, one or more carriers 330*a*, 330*b*, 330*c* may be inserted into the mold 300 to arrange optical elements into the dispensed mix 330 at specified vertical positions. Each of the carriers 330*a*, 330*b*, 330*c* secures one or more optical elements (e.g. between 1 and 1000, 10 and 500, or about 100 optical elements) along the length of the carrier 330*a*, 330*b*, 330*c*. For example, the carriers may hold a selected number of optical elements along a length (e.g. corresponding to a length (L) of mold 330). Carriers 330*a*, 330*b*, and 330*c* each hold five optical elements along the length L of the mold 300. In some exemplary embodiments, carriers 330*a*, 330*b*, 330*c* may be configured similar to a bandolier.

Each carrier 330*a*, 330*b*, 330*c* may be inserted into the mold 300 through the opening 300 at a specified time point during the dispensation of the mix 330 to create a desired vertical displacement h between each successive carrier that is inserted. For example, the selected vertical displacement h can be increased by increasing the delay in time between when successive carriers are inserted into the mold 300. In some embodiments, a consistent displacement h is maintained between each successive carrier. In other embodiments, displacement h is varied between each successive carrier, and/or displacement h may be random or have the appearance of being random.

Carriers 330*a*, 330*b*, 330*c* may be configured to maintain the optical elements in a particular orientation relative to a thickness of the mold cavity. In an exemplary embodiment, carriers 330*a*, 330*b*, 330*c* may be inserted in a particular orientation such that the optical elements secured by the carriers 330*a*, 330*b*, 330*c* are substantially parallel to the thickness of a slab to be formed by the mold 300. For example, the carriers 330*a*, 330*b*, 330*c* can be initially oriented such that the lengths of the secured optical elements are parallel to the height of mold 300 before insertion into the mold 300 (e.g. as shown by carrier 330*a*). After the carriers 330*a*, 330*b*, 330*c* are inserted through the opening 302, the orientation may be adjusted (e.g. indirectly due to forces from the mix 330 being dispensed) such that optical elements are parallel to the thickness of mold (e.g. as shown by carriers 330*a* and 330*b*). In some embodiments, carriers 330*a*, 330*b*, and/or 330*c* may be inserted in a particular orientation such that the optical elements secured by the carriers 330*a*, 330*b*, and/or 330*c* are maintained in a selected orientation non-parallel to the thickness of a slab to be formed by the mold 300. A non-parallel orientation may be selected to affect the aesthetic that results from the optical elements, for example.

In some optional embodiments, multiple different mixes can be dispensed into the mold 300. In such embodiments, different conveyer lines can be used to transport respective mixes according to a predefined pattern such that the different particulate mixes pour into the mold 300 according to a predetermined series of successive layers, some or all of which can form veins in a slab that is formed using the mold 300. Optionally, each of the successive layers of the different mixes can be dispensed in different amounts, thereby providing differently sized and positioned veins or striations. Furthermore, each individual layer may be differently sized at one end of the mold 300 compared to the other end of the mold 300, thereby further enhancing the complex striations and veining patterns in a hardened slab that is formed using the mold 300.

In an exemplary embodiment, after the dispensation of the mix 330 has been completed, the mold 300 may be shifted to a horizontal orientation for subsequent compaction and curing operations. For example, during these operations, the mixture and the optical elements within the mold 300 are compacted together such that the mold 300 defines a generally continuous thickness.

Figure 3B:
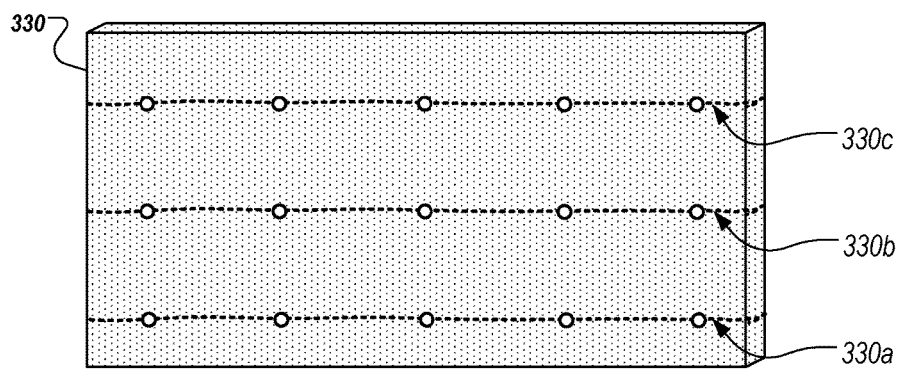
FIG. 3B is a top view of an example of a processed slab with embedded optical elements that is formed using the slab mold illustrated in FIG. 3A.

Referring now to FIG. 3B, an example of a processed slab 330 formed with the mold 300 is depicted. In some embodiments, the thickness of the slab 330 is at least 0.2 cm, between about 0.2 cm and 5 cm, and preferably about 3 cm. As shown, the processed slab 330 includes, within its internal structure, carriers 330*a*, 330*b*, and 330*c*, which were inserted into the mold 300 during the dispensation of the mix 330 into the mold 300 through the opening 302. In an exemplary embodiment, the carriers 330*a*, 330*b*, and 330*c* are not visible on the front and rear major surfaces of the processed slab 330. The ends of the optical elements 312 that are secured by the carriers are visible on the front and rear major surfaces (e.g. because their lengths are substantially equal to the thickness of the processed slab 330).

Figure 4A:
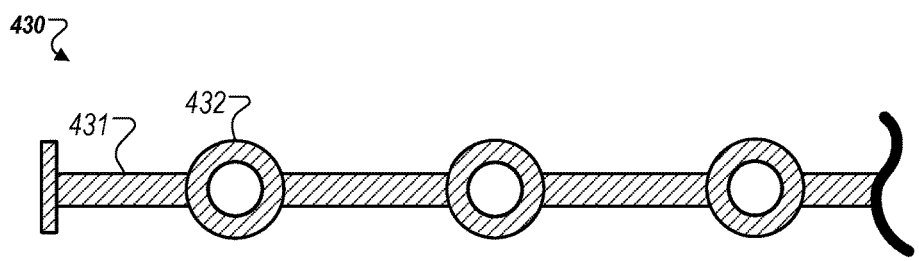
FIGS. 4A and 4B are top and side views of an example of a carrier apparatus that is used to secure and insert optical elements into a pigmented particulate mineral mix, in accordance with some embodiments.
Figure 4B:
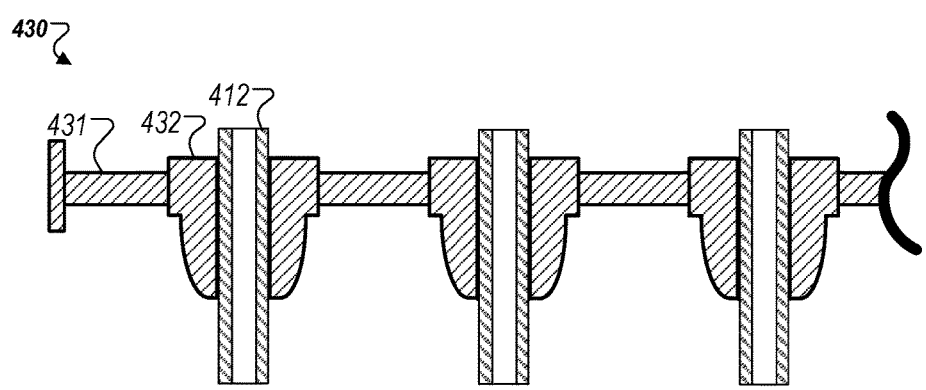

Referring to FIGS. 4A and 4B, top and side views of a carrier 430 are shown. The carrier 430 may include a polymer (e.g. including a flexible or elastomeric material), paper, wood, metal, or a combination thereof, such that carrier 430 may maintain one or more optical elements in a desired orientation. The carrier 430 includes a body 431 (e.g. a frame), and one or more holding structures 432 which may secure an optical element 412 to be embedded into the particulate mix.

In some embodiments, the carrier 430 can be used to secure optical elements 412 as they are positioned into a mineral mix, and may be particularly advantageous when dispensing into a vertically oriented slab. For example, optical elements 412 may be secured by holding structures 432 defining openings sized to accommodate optical elements 412.

In an exemplary embodiment, carrier 430 includes a plurality of holding structures 432 arranged linearly, and the length of the carrier 430 may be similarly or slightly less than the length of a mold, such as mold 300. Alternatively or additionally, the size of carrier 430, and particularly holding structures 432, may be selected to be sufficiently small that the carrier is not visible in the finished stone slab and does not substantially reduce the structural integrity of the finished stone slab.

Figure 5:
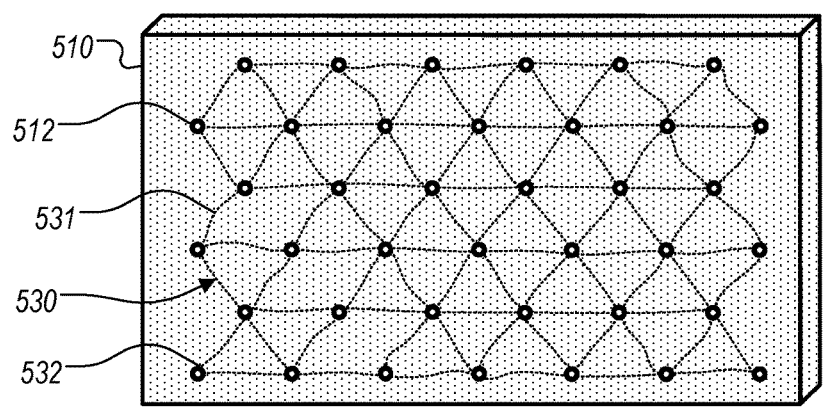
FIG. 5 is a top view of an example of a processed slab with embedded optical elements that are secured using an internal structure during the slab formation process.

Referring to FIG. 5, a top view of an example of a processed slab 510 including embedded optical elements 512 and an internal structure 530 is shown. Internal structure 530 may include one or more body portions 531 and one or more holding structures 532. For example, the internal structure 530 can include a rigid body attached to a set of holding structures 531 having features and characteristics similar to the body 431 and holding structures 432 of carrier 430 (FIGS. 4A and 4B).

During an exemplary slab formation process, optical elements 512 may be initially secured in the holding structures 532 of the internal structure 530. The internal structure 530, together with the optical elements 512 positioned at least partially within holding structures 532, may be positioned within a pigmented particulate mineral mix dispensed into a slab mold (e.g. such as a slab mold depicted in FIG. 2A or 3A). The dispensed particulate mix and internal structure 530 are then treated to form a hardened slab (e.g., vibrated, compacted, and cured to form a hardened slab). The structure and orientation of the internal structure 530 can be maintained during the compaction and curing processes. After the hardened slab has been formed, the optical elements 512 are embedded within the hardened slab in the position and orientation in which they were secured by the internal structure 530.

Figure 6:
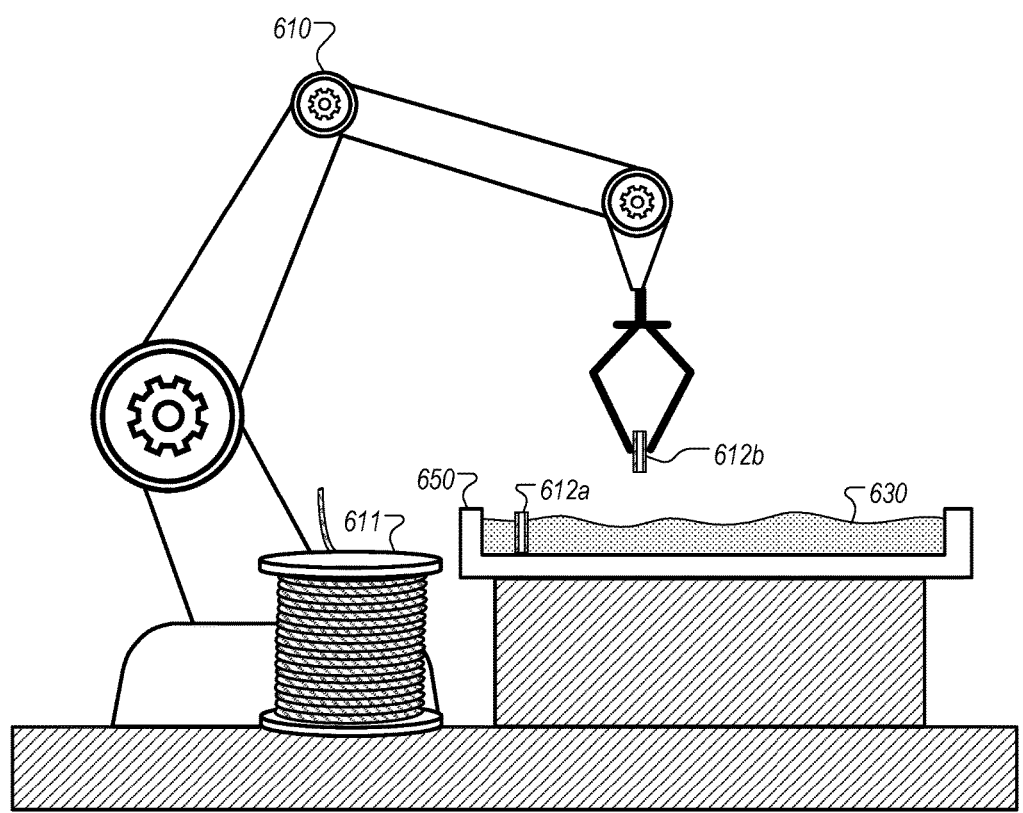
FIG. 6 is a side view of an example of a carrier arm that can be used to automatically insert optical elements into a pigmented particulate mineral mix.

Referring to FIG. 6, a side view of an example of a carrier 610 that can be used to insert optical elements into a pigmented particulate mineral mix is shown. In an exemplary embodiment, carrier 610 may be configured as a carrier arm (e.g. a robotic carrier arm) programmed to place individual optical elements (e.g. optical elements 612a, 612b) at a particular location within the pigmented particulate mineral mix 630 in slab mold 650.

The carrier arm 610 includes a supply 611 of optical elements (e.g. that provide optical elements 612a, 612b, etc.). In an exemplary embodiment, supply 611 comprises a spool of optical elements (e.g. optical element material that is not yet cut to size or separated into individual optical elements). The carrier arm 610 may feed material from the spool, and cut the optical element material to generate optical elements of a predefined length (e.g. a length similar to the thickness of the slab to be formed). The material may be cut before insertion into mineral mix 630, or may be cut to size after insertion into mineral mix 630. In other exemplary embodiments, supply 611 may include a magazine of optical elements that are pre-cut to length and ready for insertion into mineral mix 630.

The carrier arm 610 positions individual optical elements, such as optical elements 612a, 612b, in specified locations of the slab mold 650. Optical elements 612a, 612b may be placed based on a predetermined pattern to create a desired optical element array within a processed slab. For example, the robotic carrier arm 610 may be programmed to place optical elements at specified coordinate locations along the major surface of the slab mold 650 (e.g. corresponding to the major surface of the slab to be formed) to form a particular pattern, logo, image, etc.

In some exemplary embodiments, carrier arm 610 inserts optical elements in a multistep process. For example, in a first step, carrier arm 610 may insert a rigid pin or projection into mix 630 to form an opening or depression. In a second step, the optical element may be inserted into the previously formed opening or depression.

Figure 7:
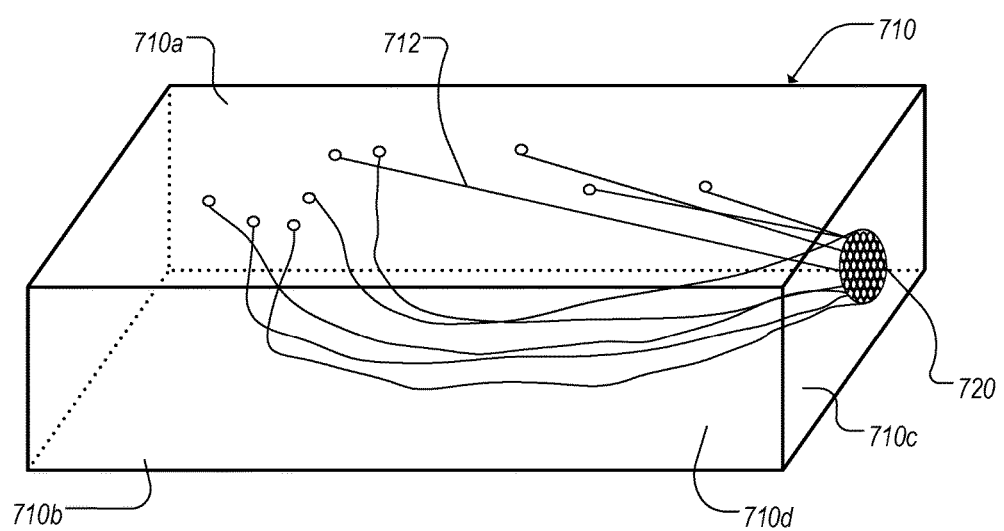
FIG. 7 is a perspective view of a processed slab with embedded optical elements.

Referring to FIG. 7, an exemplary slab 710 is shown including embedded optical elements 712. Slab 710 includes a front major surface 710a, a rear major surface 710b, and side surfaces, such as side surfaces 710c. In various exemplary embodiments, slab 710 may have features similar to slab 110 described herein.

The optical elements 712 are arranged within the slab 710 such that light transmission between various locations of slab 710 is facilitated. In an exemplary embodiment, optical elements 712 are positioned to facilitate light transmission from a light source 720 proximate side surface 710c to front major surface 710a. Multiple optical elements 712 may be tightly distributed near light source 720, and extend through slab 710 various distances, orientations, etc., to locations near front major surface 710a (e.g. spread across the front major surface). In this way, optical elements 712 may facilitate transmission of light from a relatively small area (e.g. near light source 720) to a relatively larger area (e.g. across front major surface 710a).

In various exemplary embodiments, light source 720 may be positioned proximate any of one or more surfaces of slab 710, and optical elements 712 may be arranged to transmit light to any surface of slab 710. In some embodiments, multiple light sources may be located near one or more surfaces of slab 710, and optical elements 712 may be arranged to transmit light to the same or different surfaces of slab 710 (e.g. a first set of optical elements 712 may be arranged to transmit light between a light source proximate side surface 710c to front major surface 710a, and a second set of optical elements 712 may be arranged to transmit light between a light source proximate side surface 710d to front major surface 710a). Optical elements 712 and light source(s) 720 may be arranged to provide a selected visual appearance, particularly when light is transmitted through optical elements 712.

Optical elements may be positioned linearly or having a curvature through slab 710. For example, some optical elements 712 may be arranged to extend between light source 720 and a location near front major surface 710a substantially linearly (e.g. such optical elements 712 may be relatively rigid). Alternatively or additionally, some optical elements 712 may be arranged to curve between light source 720 and a location near front major surface 710a (e.g. such optical elements 712 may be relatively flexible).

In some exemplary embodiments, slab 710 may be formed by a processing involving multiple stages if of distributing particulate mineral mix into a mold and positioning optical elements 712. For example, a slab mold may be partially filled with a particulate mineral mix. The optical elements may then be positioned within the particulate mineral mix (e.g. manually, automatically, via a carrier, etc.). After positioning optical elements, additional particulate mineral mix may be distributed into the mold to at least partially cover the optical elements. In some embodiments, these steps may be repeated to fill the mold and provide a desired arrangement of optical elements. The filled mold may then advance to one or more pressing and curing operations to form a hardened slab.

Figure 8:
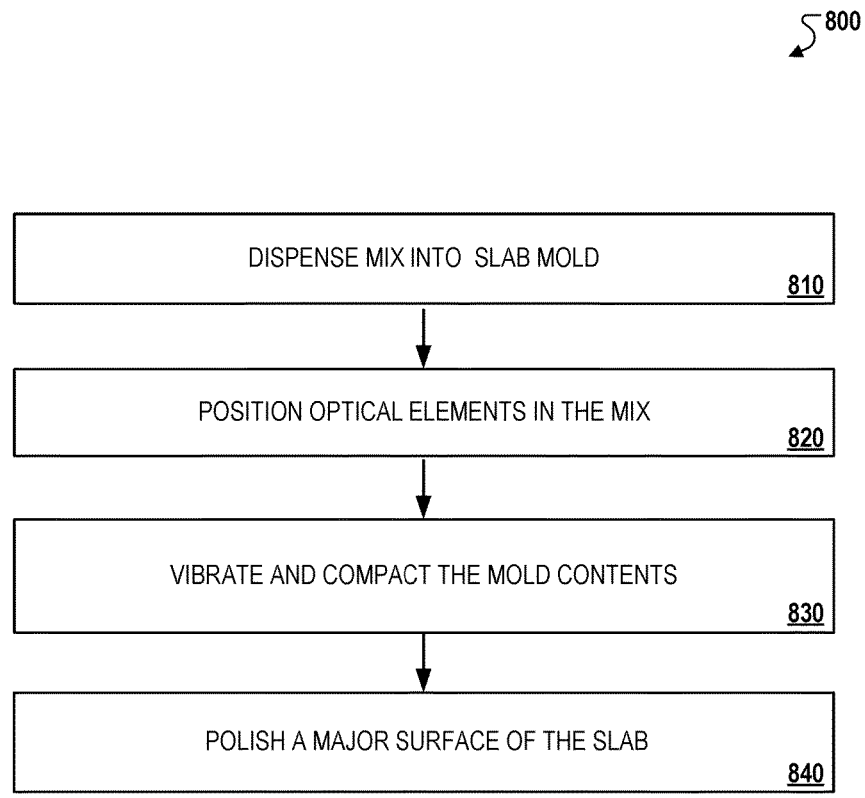
FIG. 8 is a flow diagram of an example process for a processed slab product with embedded optical elements.

FIG. 8 is a flow diagram of an example process 800 for forming a processed slab with embedded optical elements (e.g. such as slab having features and characteristics similar to slab 110 described herein). In some embodiments, the process 800 may optionally be performed by a slab forming system that includes various conveyors that move a slab mold between different stations where each operation of the process 800 is performed. The process 800 may include use of various types of slab molds such as the mold depicted in FIG. 2A or 3A.

The process 800 may include the operation 810 of dispensing a particulate mineral mix into a slab mold. For example, a dispensing head of a distributor can be configured to controllably release a particulate mineral mix through one or more apertures into the slab mold. The dispensing head may be configured with a shutter or valve apparatus that is controllable to regulate the flow of the particulate mineral mix from the dispensing head to the slab mold. The dispensing head may be additionally controllable to dispense filler into the slab mold at a substantially repeatable rate.

The process 800 can also include the operation 820 of positioning a plurality of optical elements in the particulate mineral mix. The optical elements may be positioned to be parallel with a mold thickness. In some embodiments, the plurality of optical elements are positioned in the mix with a carrier that has protruding elements configured to hold the optical elements and/or impart rigidity to facilitate insertion into the particulate mineral mix. The protruding elements holding the optical elements can be lowered into the mix. In other embodiments, the plurality of optical elements is positioned in the mix with the use of a carrier apparatus that secures the optical elements in holding structures, such as the carrier apparatus 400 shown in FIGS. 4A and 4B. Alternatively or additionally, the optical elements are positioned in the mix with the use of a carrier that places individual optical elements in specified locations within the slab mold based on a predetermined optical element arrangement.

The process 800 may also include the operation 830 of vibrating and compacting the particulate mineral mix (e.g. contemporaneously vibrating and compacting the particulate mineral mix) and plurality of optical elements in the mold so as to form a processed slab. The mixture within the mold, including the particulate mineral mix and the embedded optical elements arranged within the mold, may be processed using a compression molding operation (e.g., vibro-compaction molding, curing, etc.). During this operation, a slab mold can be encased with a top cover mold piece and transported to a vibro-compaction station that applies compaction pressure, vibration, and vacuum to the contents inside the slab mold, thereby converting the particulate mix into a rigid slab.

In some embodiments, the process 800 may optionally include an operation of curing the compacted slab. For example, curing the compacted slab may include curing the mineral mix via a heating process, thereby further strengthening the slab formed inside the slab mold.

The process 800 can also include the operation 840 of polishing a surface of the processed slab. For example, after the curing operation 840, the cured slab can be transferred to a polisher station where a major surface of the slab is polished to a predetermined finish. One or more front, back, or side surfaces may be polished at polisher station, and a degree of polish (e.g. the resulting gloss level, surface texture, etc.) may vary between one or more of the front, back, or side surfaces. In some embodiments, the polished or otherwise exposed major surface can provide an outer appearance that is substantially repeatable. Polishing operation 840 may include polishing and/or exposing one or both ends of embedded optical elements to form a major surface of the finished stone slab that has a consistent appearance substantially free from discontinuities and/or that allows transmission of light through a thickness of the slab at discrete locations of the optical elements.

Various operations of process 800 may be performed in any order. In an exemplary embodiment, the fiber optic elements may be positioned in the mold, and some or all particulate mix to form the slab distributed into the mold after the fiber optic elements are positioned. For example, embodiments described herein (e.g. with reference to FIGS. 1-7) may be formed in any suitable sequence, including positioning optical elements within the mold before the mold is filled with particulate mix. The particulate mineral mix, including embedded optical elements, may then be vibrated and compacted (e.g. in operation 830) so as to form a processed slab.

While this specification contains many specific implementation details, these should not be construed as limitations on the scope of any technology described herein or of what may be claimed, but rather as descriptions of features that may be specific to particular embodiments. Certain features that are described in this specification in the context of separate embodiments can also be implemented in combination in a single embodiment in part or in whole. Conversely, various features that are described in the context of a single embodiment can also be implemented in multiple embodiments separately or in any subcombination. Moreover, although features may be described herein as acting in certain combinations and/or initially claimed as such, one or more features from a claimed combination can in some cases be excised separate from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A processed slab, comprising:
   a front major surface and a rear major surface, the front and rear major surfaces at least 2 feet wide by at least 6 feet long and extending perpendicularly to a slab thickness defined by a particulate mineral mix; and
   a plurality of optical elements each having a first end, a second end, and a length between the first and second ends;
   wherein all of the optical elements are surrounded by the particulate mineral mix between the first and second ends such that the entire length of each optical element is directly contacted by the particulate mineral mix.

2. The processed slab of claim 1, wherein the optical elements allow transmission of light between the front major surface and the rear major surface.

3. The processed slab of claim 2, wherein the optical elements comprise fiber optic cables.

4. The processed slab of claim 1, wherein the front major surface comprises the particulate mineral mix and first ends of the optical elements.

5. The processed slab of claim 1, wherein the optical elements are arranged such that the length of each optical element is parallel to the slab thickness.

6. The processed slab of claim 1, wherein each of the plurality of optical elements is arranged within the processed slab according to a predetermined design.

7. The processed slab of claim 1, further comprising a light source configured to transmit light between the front major surface and the rear major surface through at least one of the plurality of optical elements.

8. The processed slab of claim 1, wherein the particulate mineral mix comprises quartz.

9. The processed slab of claim 1, wherein the length of each optical element is equal to the slab thickness.

10. A processed article, comprising:
    a processed slab having a front major surface and a rear major surface, the front and rear major surfaces at least 2 feet wide by at least 6 feet long and extending perpendicularly to a slab thickness defined by a particulate mineral mix;
    a plurality of optical elements having a length between first and second ends; and
    a carrier web connected to the processed slab at least partially by the plurality of optical elements;

wherein the optical elements are each attached to the carrier web in a fixed array proximate the first ends, and extend through the slab thickness;

wherein the carrier web is configured to be separable from the processed slab.

11. The processed article of claim 10, further comprising a light source configured to transmit light through at least one of the plurality of optical elements between the first and second ends.

12. The processed article of claim 10, wherein the processed slab comprises quartz.

13. The processed article of claim 10, wherein the plurality of optical elements comprise fiber optic cables.

14. The processed article of claim 10, wherein each of the plurality of optical elements are arranged within the processed slab according to a predetermined array.

15. The processed article of claim 10, wherein the optical elements each extend completely through the slab thickness in a direction parallel to the slab thickness.

16. A process of forming a processed slab, comprising:
dispensing a particulate mineral mix into a slab mold;
positioning a plurality of optical elements within the slab mold;
contemporaneously vibrating and compacting the particulate mineral mix and plurality of optical elements arranged in the slab mold so as to form a processed slab that is generally rectangular and has a front major surface and a rear major surface; and
polishing the front major surface of the slab;
wherein the plurality of optical elements each have a length between first and second ends, and wherein each optical element is surrounded by the particulate mineral mix between the first and second ends such that the entire length of each optical element is directly contacted by the particulate mineral mix, and the first end is visible at the front major surface and the second end is visible at the rear major surface.

17. The process of claim 16, wherein the plurality of optical elements allow passage of light between the front major surface and the rear major surface.

18. The process of claim 16, wherein dispensing the particulate mineral mix is performed after the step of positioning a plurality of optical elements within the slab mold.

19. The process of claim 16, wherein positioning the plurality of optical elements in the mold comprises inserting the optical elements into the particulate mineral mix within the mold.

20. The process of claim 16, wherein the front major surface is defined by the particulate mix and first ends of the optical elements.

21. The process of claim 16, wherein the length of each optical element is parallel and equal to a slab thickness between the front major surface and rear major surface.

22. A process of forming a processed slab, comprising:
dispensing a particulate mineral mix into a slab mold;
positioning a plurality of optical elements within the slab mold;
contemporaneously vibrating and compacting the particulate mineral mix and plurality of optical elements arranged in the mold so as to form a processed slab that is generally rectangular and has a front major surface and a rear major surface; and
polishing the front major surface of the slab;
wherein the plurality of optical elements each have a length between first and second ends, and wherein each optical element is surrounded by the particulate mineral mix between the first and second ends, and the first end is visible at the front major surface and the second end is visible at the rear major surface;
wherein positioning the plurality of optical elements in the mold comprises inserting the optical elements into the particulate mineral mix within the mold; and
further comprising inserting a projection into the particulate mineral mix to form a hole in the particulate mix, and wherein the step of positioning the plurality of optical elements in the mold comprises inserting an optical element into the hole.

23. The process of claim 22, wherein the length of each optical element is parallel and equal to the slab thickness.

24. A processed slab, comprising:
a front major surface and a rear major surface, the front and rear major surfaces at least 2 feet wide by at least 6 feet long and extending perpendicularly to a slab thickness defined by a particulate mineral mix; and
a plurality of means for transmitting light between the front major surface and the rear major surface, the plurality of means for transmitting light being oriented parallel to one another, the plurality of means for transmitting light surrounded by the particulate mineral mix such that an entire length of each of the plurality of means for transmitting light between the front major surface and the rear major surface is directly contacted by the particulate mineral mix.

25. The processed slab of claim 24, wherein each means for transmitting comprises a fiber optic cable having a first end, a second end, and a length between the first and second ends, wherein the length of each fiber optic cable is equal to the slab thickness.

26. The processed slab of claim 25, wherein each fiber optic cable is completely surrounded by the particulate mineral mix between the first and second ends.

27. The processed slab of claim 24, wherein the plurality of means for transmitting light are arranged such that the length of each of the plurality of means for transmitting light is parallel to the slab thickness.

* * * * *